No. 802,277. PATENTED OCT. 17, 1905.
J. J. FRIČ.
SIGHT FOR GUNS.
APPLICATION FILED JUNE 12, 1905.
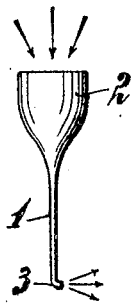
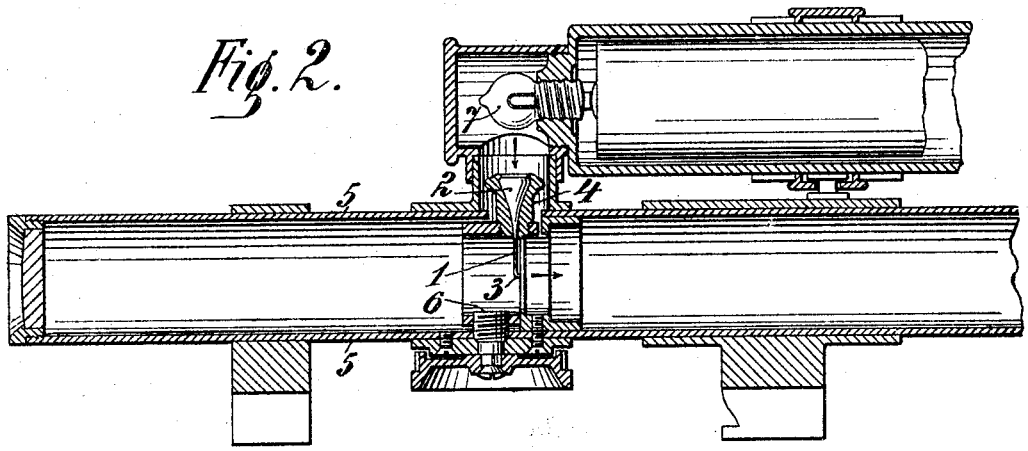

UNITED STATES PATENT OFFICE.

JOSEF JAN FRIČ, OF VINOHRADY-PRAGUE, AUSTRIA-HUNGARY.

SIGHT FOR GUNS.

No. 802,277. Specification of Letters Patent. Patented Oct. 17, 1905.

Application filed June 12, 1905. Serial No. 264,761.

*To all whom it may concern:*

Be it known that I, JOSEF JAN FRIČ, a subject of the Emperor of Austria-Hungary, residing at Vinohrady-Prague, in the Kingdom of Bohemia, Empire of Austria-Hungary, have invented a new and useful Sight or Dispart for Guns and the Like, of which the following is a specification.

My invention relates to improvements in sights for guns and the like, which are provided with spy-glasses or telescope; and the object of my improvements is to provide a sight which is perfectly visible even if the aim would be obscure and unsufficiently lighted and discerned. I attain this object by a sight of glass, illustrated in the accompanying drawings, in which—

Figure 1 is a vertical view and axial section through the aiming spy-glass or telescope as set upon the gun. Fig. 2 is a vertical view of the glass sight.

The sight is formed by a thread of glass 1, appropriately shaped and drawn from a thick bar of glass 2. The light is made to enter into the glass at its thick end 2, traversing it along and being several times differently reflected in and through the glass thread 1 till it goes out at the end 3 of the latter, as indicated in the drawings by the arrows. I form preferably a small globule at said end 3 of the crystalline glass piece, which causes it to appear as if it would be itself lighting in the objective.

It is to be understood by itself that the light may be concentrated by different combinations of lenses before its entering into the glass bar, and the glass thread can be differently shaped, as the case may be, silvered, and so on.

Fig. 2 shows an example of the spy-glass. The glass sight is mounted in a cylindrical casing 4, which is adjustable in the telescope-tube 5 by means of the known screw 6, and so on, it being necessary that the lighting-globule 3 should be placed exactly in the focus. A small electric lamp 7 may be installed on the top over the glass head 2, so as to be invisible from outside, while at the same time it throws light in the direction as indicated by the arrows. If the light is excluded from entering into the glass, then the globule 3 appears black; but if the thick end of the glass is open to daylight then the point 3 appears as if it would be lighting, a weak twilight being already sufficient to produce this effect. Said electric hand-lamp 7 is preferably to be used during the night or in case of the daylight being by any other reason excluded.

I do not bind myself to the arrangement of the telescope or spy-glass only as shown by the accompanying drawings as a mere example of carrying out my invention; but What I do claim as my invention, and desire to secure by Letters Patent, is—

The combination of a glass sight for guns and the like, being drawn from a bar of crystalline glass 2 into a glass thread 1 whose preferably globular end or point 3 is placed in the focus of the aiming telescope or spy-glass and reflects either daylight or artificial light through its thick end sending it into the eye of the observer through the globule 3 as needed, or appearing black if the aim is lighted (lit up) all substantially and for the purpose as set forth.

In testimony whereof I affix my signature in presence of two witnesses.

JOSEF JAN FRIČ.

Witnesses:
 ADOLPH FISCHER,
 EMIL WENDLING.